US005694836A

United States Patent [19]
Blevins

[11] Patent Number: 5,694,836
[45] Date of Patent: Dec. 9, 1997

[54] MODULAR LOOSE EGG COOLING, STORAGE AND TRANSPORT SYSTEM AND METHOD

[75] Inventor: Edward A. Blevins, North Vernon, Ind.

[73] Assignee: Cool Eggspress, North Vernon, Ind.

[21] Appl. No.: 762,946

[22] Filed: Dec. 10, 1996

[51] Int. Cl.$^6$ .................. A23L 1/32; A23B 5/04
[52] U.S. Cl. .................. 99/517; 62/63; 62/121; 99/355; 99/473; 426/300; 426/393; 426/524; 426/614; 206/386; 206/503
[58] Field of Search .................. 99/516, 517, 467, 99/470, 473–476, 483, 355; 62/63, 64, 70, 121, 374, 380; 165/94, 120; 426/298, 300, 521–524, 237, 238, 393, 614; 206/386, 503, 509, 511, 557; 220/600, 23.4, 4.03; 108/53.3, 56.1, 902

[56] References Cited

U.S. PATENT DOCUMENTS

| | | | |
|---|---|---|---|
| 3,672,530 | 6/1972 | Bridenstine et al. | 220/4 |
| 3,843,813 | 10/1974 | Driggs | 426/521 X |
| 3,857,342 | 12/1974 | Johns | 108/53 |
| 3,882,686 | 5/1975 | Rose | 62/63 |
| 4,960,207 | 10/1990 | Tabler et al. | 206/507 |
| 5,121,611 | 6/1992 | Broderdorf et al. | 62/381 X |
| 5,123,533 | 6/1992 | Uitz | 206/386 |
| 5,135,109 | 8/1992 | Vergara | 206/386 |
| 5,156,006 | 10/1992 | Broderdorf et al. | 62/121 X |
| 5,167,976 | 12/1992 | Papetti | 426/614 X |
| 5,205,410 | 4/1993 | Kuipers et al. | 206/386 |
| 5,415,882 | 5/1995 | Knipper et al. | 426/614 X |
| 5,474,794 | 12/1995 | Anderson et al. | 426/524 |

Primary Examiner—Timothy F. Simone
Attorney, Agent, or Firm—Woodard, Emhardt, Naughton, Moriarty & McNett

[57] ABSTRACT

A modular loose egg cooling, storage, and transport system for use in the egg industry to safely transport eggs and to facilitate rapid cooling of eggs to be stored. The modular egg system includes first and second vertical members adapted to mate with each other in a criss-cross configuration and to mate in a sandwich structure with deck boards. The assembled modular egg system comprises four of these criss-cross support structures sandwiched between five deck boards to form a shift-resistant unit with the lowermost deck board fastened to any plastic foot assembly to serve as a pallet. The deck board includes a plurality of depressions designed to accept the footprint of any commercial egg tray and thereby lock stacks of these egg trays in place within the modular egg system. All components of the system define apertures therethrough to encourage airflow over and around the stacks of egg-containing trays placed on the deck boards. Using such a modular egg system, stacks of loose eggs may be cooled rapidly and evenly for storage and may be transported without requiring use of special egg trays, plastic wrapping, or corner safety guards. The modular egg system also comprises such positive location features that it may be mechanically assembled and disassembled, and the egg-containing trays may be mechanically loaded and unloaded therefrom.

16 Claims, 6 Drawing Sheets

MODULAR LOOSE EGG COOLING, STORAGE AND TRANSPORT SYSTEM AND METHOD

FIELD OF THE INVENTION

The present invention relates generally to the field of commercial egg transport, storage, and cooling, and more specifically, to a system of modular components which may be interlocked to form an egg skid for cooling, storage, and transport of the eggs.

BACKGROUND OF THE INVENTION

Commercial egg packing, processing, and chicken breeding facilities handle millions of eggs a day. Because not all eggs laid are destined to end up in cartons on the grocery shelf, a significant number of loose eggs must be packed for transport to other facilities. In the past, this packing involved filling trays with the loose eggs, stacking those egg-filled trays by hand six high, four across, and three deep onto wooden flats and between solid vertical divider boards which supported the weight of other wooden flats placed on top of the divider boards, then hand stacking these flat/ vertical support combinations five or six high on an ordinary wooden transport pallet. This completed assembly was called an egg skid, and it was used to transport the eggs to an egg processing center or hatchery. If the eggs were sent to a processing center, the wooden skids also served to store the eggs during the FDA-mandated cooling stage.

Conventional egg skid systems are manufactured from sheets of plywood, flake board, or cardboard to hold the stacks of egg trays in place during transport, storage, and cooling. These wood designs do not have sides on them to prevent the egg stacks and/or the vertical supports in the skid system from sliding off the smooth surfaces of the flats, so corner guards and cardboard covers must be added and the entire skid stretch wrapped in plastic sheeting to keep the eggs in place. This wrapping is undesirable both because it requires extra materials and labor and because, once the eggs reach the cooling area, air cannot circulate in the skid to cool the eggs.

It is clear from the foregoing discussion that there is a need for a more stable egg transport system. However, an even more important requirement for the egg industry is that any improved transport system must also facilitate rapid cooling of the eggs in the manner prescribed by the U.S. Food and Drug Administration (FDA).

Eggs are highly perishable items and must be cooled quickly if they are to be stored for any length of time. For these reasons, the FDA has mandated that eggs must be stored at 45° F., and the eggs must be cooled to this temperature within 72 hours of their arrival at a packing or processing facility. This cooling rate has traditionally been difficult to achieve with conventional skid systems since the eggs remain wrapped in plastic and separated by solid vertical supports throughout the cooling process. Even if the plastic sheeting, cardboard overlays, and corner guards are removed prior to cooling the eggs, the solid vertical supports do not permit air to circulate through the center of the skid. As well, any improvement in airflow brought by removing the plastic wrapping is not justifiable since it increases the instability of the skid.

Conventional egg skids are undesirable for several additional reasons. First, no matter how stable the structure, some eggs will break and the residue must be removed. If eggs break while packed on a wooden egg skid, the wood, because of its porous nature, cannot be effectively washed to make it sanitary again and microorganisms can grow. Second, the heavy use endured by egg skid systems takes its toll on wooden designs, making wooden skids usable for only one to two years. Third, wooden designs break frequently, and they cannot be recycled after they become unusable. Therefore, these previous skid designs are, at best, inadequate holders for the eggs, and, at worst, unstable and unsanitary relics of a less automated age.

Attempts have been made to design a more stable, stackable flat to hold the stacks of egg trays. For example, U.S. Pat. No. 5,205,410 to Kuipers et al. discloses a plastic panel or deck board having raised edges and embossed depressions on its upper and lower surfaces to accept egg tray stacks and lock them into a shift-resistant egg skid. This and similar designs, however, still suffer from a number of drawbacks associated with the wooden designs.

The Kuipers et al. design is unstable because it lacks vertical supports and undesirable because it can only accommodate one particular type of egg tray. This panel system still requires the use of corner guards and plastic wrapping. Also, if an egg stack is not properly positioned on the panel (a simple mistake to make with that design), it will not sit straight, and the eggs in the bottom of the misaligned stack can be crushed. Further, Kuipers et al.'s design employs a wooden forklift pallet which means that the skid unit is still not completely washable.

Accordingly, there is a need in the egg industry for a modular, interlocking, durable, non-absorbent, completely washable egg skid system which will lock in position stacks of egg-filled trays for transport and storage and which can be dismantled and stored flat when not in use. Such a modular egg skid system desirably incorporates features to maximize airflow throughout the system, thereby allowing swift and even cooling of all eggs in the system. There also exists a need for a modular egg skid system which is lightweight, cheap and easy to produce from a USDA-approved material, capable of being mechanically loaded and unloaded, and which can be recycled once it has outlived its usefulness. The present invention addresses these needs.

SUMMARY OF THE INVENTION

Briefly describing one aspect of the present invention, there is provided a modular loose egg cooling, storage, and transport system (hereinafter referred to as "modular egg system") for use in the egg industry to safely and securely transport eggs and to permit rapid cooling of the eggs when storage is required. The instant modular egg system comprises multiple modules constructed from the following three components: a deck board, a first vertical member, and a second vertical member. These components are manufactured from a lightweight, non-absorbent, washable, USDA-approved material such as plastic for strength and ease of maintenance.

The deck board possesses an upper mating surface having a plurality of connectors to attach the vertical members, a keyway surface, at least one aperture, and a lower mating surface having a plurality of connectors to attach the vertical members. The keyway surface of the deck board comprises a plurality of depressions patterned to accept multiple keys. As used herein, the footprint of any conventional egg tray is considered to be a "key."

The deck board also comprises fasteners adapted to attach a plastic foot assembly. This foot assembly/deck board combination forms a forklift pallet which permits egg handling facilities to use forklifts, whether manual- or computer-operated, to load and unload assembled modular egg skids for transport.

Each of the vertical members possesses at least one aperture, a top mating surface having at least one connector to attach the vertical member to a deck board, and a bottom mating surface having at least one connector to attach the vertical member to another deck board. The first and second vertical members also each possess at least one mating slot capable of interlocking the two types of vertical members in a criss-cross configuration.

In use, a plastic foot assembly is attached to the deck board by aligning the foot assembly with the fasteners and locking the foot assembly to the deck board to form a pallet (hereinafter referred to as "deck board pallet"). This deck board pallet is then filled with stacks of egg-containing trays, which stacks preferably comprise interlocking egg-containing trays placed one on top of another to a height of six trays per stack.

Proper positioning of the egg tray stacks relative to the deck board is accomplished by using a key and keyway system. That is, the keyway surface of the deck board is configured to accept only one orientation of the key of an egg tray. This feature facilitates mechanical loading and unloading of egg trays into the module because, once positioned, the keyway locks the key, and thereby the overlying trays in the stack, into a highly stable unit.

Once the egg filled trays are loaded on the deck board, two second vertical members are attached to the deck board by aligning the bottom mating surfaces of the two second vertical members with the upper mating surface of the deck board and using the connectors to lock the second vertical members in position on the deck board. This process is repeated with two first vertical members, but further includes the steps of criss-crossing the first vertical members relative to the second vertical members and thereafter engaging the first vertical members' mating slots with the corresponding mating slots of the second vertical members.

A second deck board is procured, and the lower mating surface of the second deck board is aligned with the top mating surfaces of the criss-crossed vertical members. The connectors then lock the vertical members in position relative to the overlying deck board. Having assembled all components of the present invention as described above, the criss-crossed vertical members and the attached overlying deck board form one module.

Once a module is assembled, the empty deck board is filled with stacks of egg-containing trays, and this process of loading with trays then assembling the next module is repeated until the system preferably reaches a height of four modules and five layers of egg tray stacks. The modular egg system of the present invention therefore comprises the combination of a deck board pallet and four modules stacked one on top of another on that pallet. Because the vertical members are used only to support the weight of overlying stacks of egg trays and modules, the stability of the uppermost egg tray layer is not compromised by the absence of vertical members between these stacks. This construction procedure forms a modular egg system which is stable and capable of bearing and evenly distributing the weight of stacks of egg-containing trays, independent of those tray stacks.

If eggs are to be stored once they reach their destination, the FDA requires that they be cooled relatively quickly. Air must therefore be able to flow over all the eggs in the system without impediment. The present invention allows for this airflow by way of the apertures defined by each component. The apertures in the first and second vertical members are preferably positioned parallel to the eggs in the egg trays to maximize airflow to the center of the system and thereby ensure that all eggs in the stack will cool rapidly.

Thus, one object of the present invention is to provide a modular loose egg cooling, storage, and transport system having airflow characteristics that promote rapid cooling of all eggs contained in the system.

Another object of the present invention is to provide a modular loose egg cooling, storage, and transport system in which the component parts interlock and stack to form a highly stable, shift-resistant unit.

Another object of the present invention is to provide a modular loose egg cooling, storage, and transport system having a forklift pallet base constructed by attaching any type of plastic foot assembly.

Another object of the present invention is to provide a modular loose egg cooling, storage, transport system that may be used with any type of commercial egg tray.

Another object of the present invention is to provide a modular loose egg cooling, storage, and transport system having such positive location features between its component parts and for the stacks of egg trays that the eggs may be loaded and unloaded mechanically at every stage of their handling.

Another object of the present invention is to provide a modular loose egg cooling, storage, and transport system that does not require use of any extra materials, for example, corner guards or plastic stretch wrapping, to impart shift-resistance or maintain stability.

A further object of the present invention is to provide a modular loose egg cooling, storage, and transport system which is manufactured from a lightweight, washable, non-absorbent, USDA-approved, durable material, such as plastic, which may be recycled once the component parts reach the end of their useful lives.

Further objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to the drawings, the modular loose egg cooling, storage, and transport system 9 (hereinafter referred to as the "modular egg system 9") of the present invention includes a deck board 10, a first vertical member 30, and a second vertical member 40. In this description, the preferred embodiment of a module 50 comprises one deck board 10 overlying and attached to the structure of two first vertical members 30 criss-crossed with and mated to two second vertical members 40.

Figure 2:
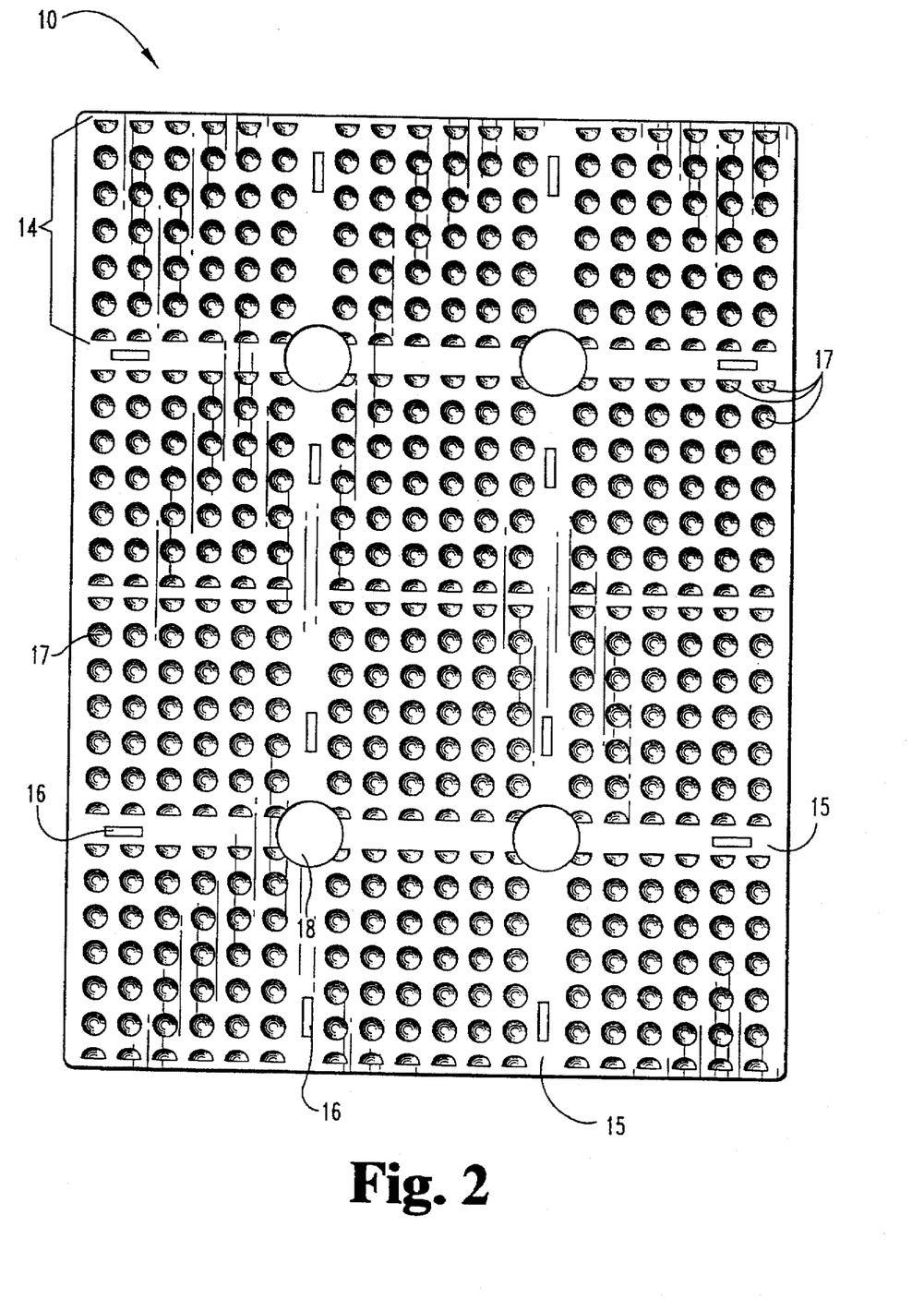
FIG. 2 is a top view of the deck board of the modular egg system of the present invention.
Figure 3:
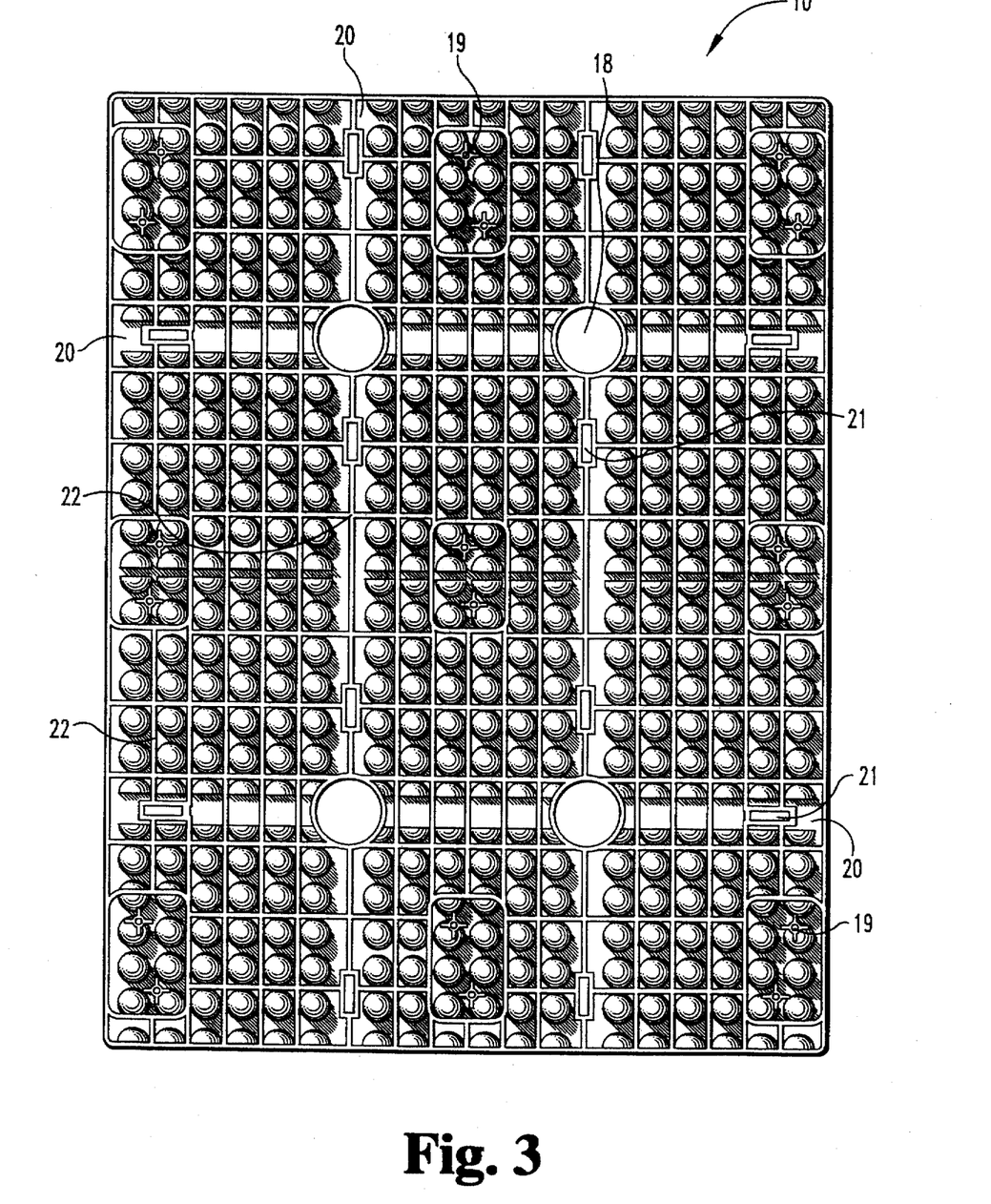
FIG. 3 is a bottom view of the deck board of the modular egg system of the present invention.

The deck board 10 comprises an upper mating surface 15 having at least one vertical member connector 16, and a lower mating surface 20 having at least one vertical member lower connector 21. The deck board 10 also comprises at least one aperture 18, at least one fastener 19 for a plastic foot assembly 13, and a keyway surface 14. Preferred embodiments of the deck board 10 also include at least one rib 22 to give the deck board 10 additional strength and rigidity.

The upper mating surface 15 may have any configuration adapted to mate with one or more vertical members, but in the preferred embodiment it is flat and has a criss-cross pattern designed to mate with and support two first vertical members 30 and two second vertical members 40. Those of ordinary skill in the art will understand that it is possible to have fewer or additional vertical members 30, 40, depending upon their design, mated to the deck board 10 without affecting the stability of the modular egg system 9.

Located on, and preferably made integral with, the upper mating surface 15 is the at least one vertical member connector 16. This vertical member connector 16 may be of any design capable of being molded into the upper mating surface 15 of the deck board 10, but preferably is of the slot or snap type adapted to receive and engage a tab type connector. In the most preferred embodiments, two vertical member connectors 16 are molded into the upper mating surface 15 per first vertical member 30 to be mated thereto, and four vertical member connectors 16 are molded into the upper mating surface 15 per second vertical member 40 to be mated thereto. Obviously, if another type of connector 16 is chosen, more or fewer connectors, depending upon the type, per vertical member will be necessary to create a stable modular egg system 9.

The lower mating surface 20 located on the underside of the deck board 10 has at least one vertical member connector 21. As with the upper mating surface 15, the lower mating surface 20 may have any configuration adapted to mate with one or more vertical members, but in the preferred embodiment comprises a mirror image of the upper mating surface 15. That is, the lower mating surface 20 is preferably flat and has a criss-cross pattern adapted to mate with at least one first vertical member 30 and at least one second vertical member 40.

Similarly, the at least one vertical member connector 21 may be of any design capable of being molded into the lower mating surface 20, but preferably is of the slot or snap type. The vertical member connectors 21 of the most preferred embodiment are molded into the lower mating surface 20 and are identical in number and location to the vertical member connectors 16 found in the upper mating surface 15.

The at least one rib 22 may be of any configuration capable of being molded into and/or formed integral with the underside of the deck board 10. Preferred embodiments of the invention comprise a plurality of ribs 22 criss-crossed with each other and extending the entire length and width of the deck board 10. However, any configuration of the at least one rib 22 capable of imparting strength and warp-resistance to the deck board 10 is contemplated by and intended to come within the scope of the instant invention.

The at least one fastener 19 may comprise any configuration such as a snap, a bolt, an interweaving plastic finger assembly, or other connection method, but whatever method is chosen, the fastener 19 is most desirably molded or otherwise formed integral with the underside of the deck board 10. Those of ordinary skill in the egg industry will understand that the number of fasteners 19 required to securely attach a plastic foot assembly 13 to the base of a deck board 10 depends upon the connection method chosen. However, preferred embodiments of the present invention use the minimum number of fasteners 19 necessary to prevent shifting of the modular egg system 9 relative to the plastic foot assembly 13 in order to facilitate swift disengagement of the foot assembly 13 during disassembly of the modular egg system 9.

Figure 1:
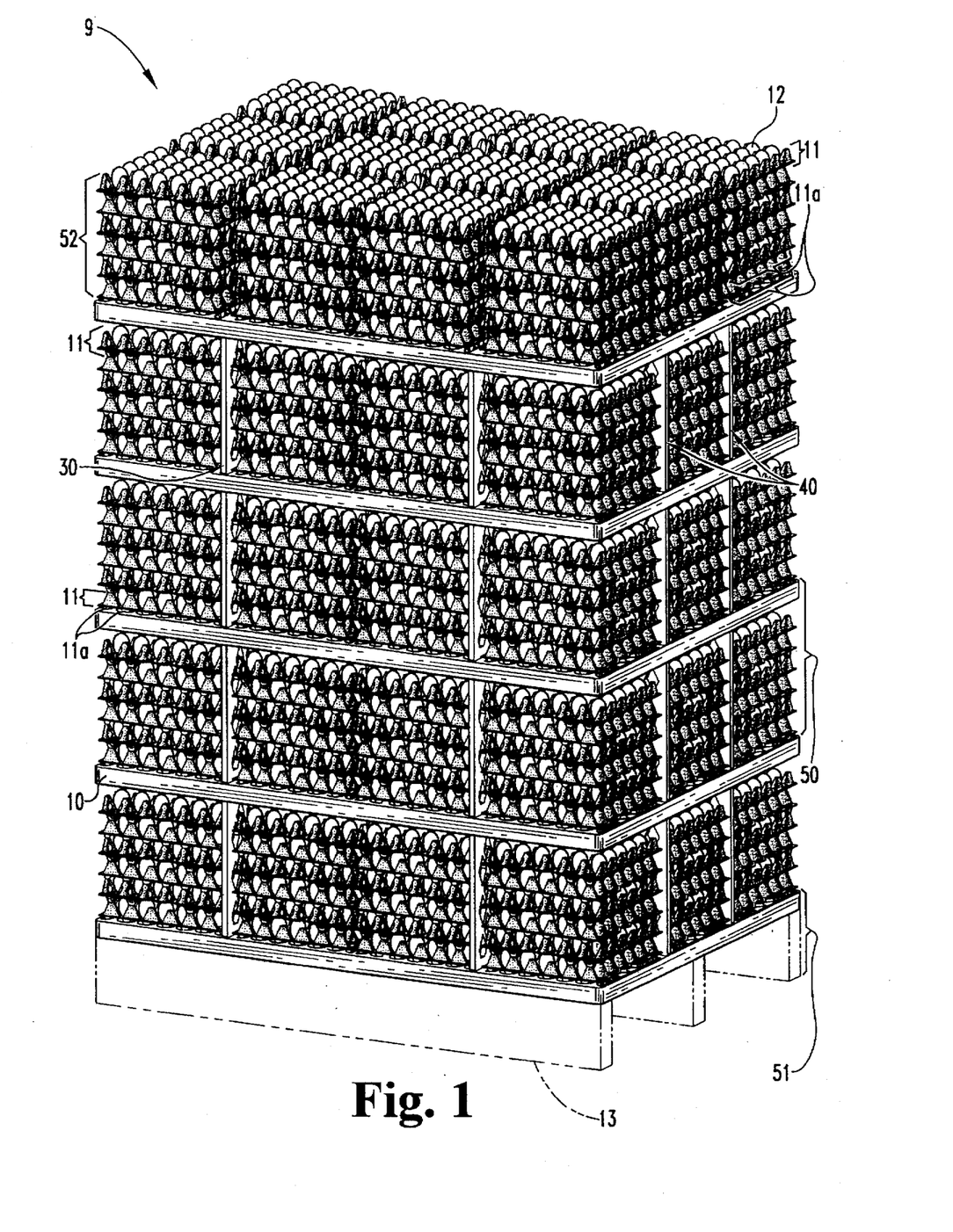
FIG. 1 is a side perspective view of the assembled modular loose egg cooling, storage, and transport system of the present invention utilizing four modules stacked one upon another, fastened to a plastic foot assembly (shown in phantom), and containing 360 trays filled with eggs.

The at least one fastener 19 is adapted to positively engage any conventional synthetic plastic foot assembly 13 such as those manufactured by EPC Loudon plastics of Latham, N.Y. and Allibert Contico of Bridgeton, Mo. This attachment of a plastic foot assembly 13 to a deck board 10 converts that basic deck board 10 into a deck board pallet 51 which then forms the base of the modular egg system 9.

The deck board pallet 51 has a number of advantages over conventional plastic or wooden forklift pallets. First, by using a plastic foot assembly 13 instead of a conventional wooden pallet, the present invention is distinguished from prior art designs because the entire modular egg system 9 is washable, durable, lightweight, and non-absorbent. All components of the modular egg system 9, including the plastic foot assembly 13, may be pressure washed if they become soiled, thereby minimizing the risk that harmful microorganisms will grow on any portion of the modular egg system 9.

Additionally, if a plastic foot assembly 13 is damaged, for example, by running into it sideways with the forks of a forklift, that damaged foot assembly 13 may be disengaged from the deck board 10 and replaced with a new foot assembly 13. In contrast, if a conventional pallet is damaged in any way, the entire pallet must be replaced. This ability to replace a single foot assembly 13 is much cheaper and less wasteful than having to replace an entire conventional pallet.

Figure 6:
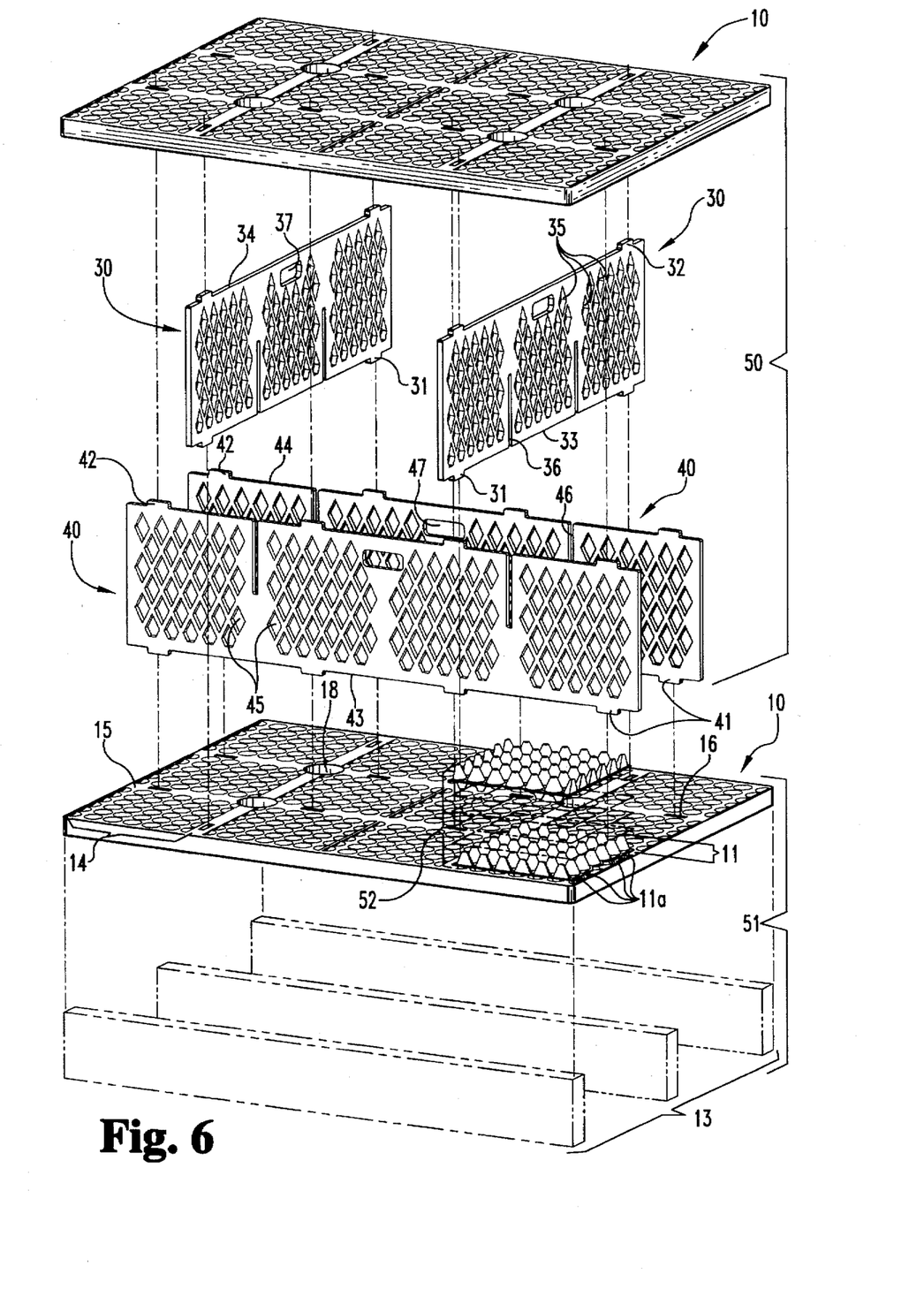
FIG. 6 is an exploded perspective view of the modular egg system of FIG. 1 showing in partial phantom a stack of six empty egg trays, the stack resting in the keyway of the deck board of the present invention.

Next describing the keyway surface 14 of the deck board 10, this keyway surface 14 comprises a plurality of depressions 17 spaced and internally configured to accept the footprint or key 11A of any conventional egg tray 11. The keyway surface 14 may be configured to hold any number of keys 11A the user desires, but the preferred embodiment of the modular egg system 9 is patterned to accommodate the maximum number of keys 11A that will fit within the dimensions of a deck board 10 sized to be controllably handled by a forklift machine.

The keys 11A will positively engage the keyway surface 14 only one way, thereby ensuring that the egg trays 11 are securely locked onto the deck board 10 and will not shift during transport and storage. This key and keyway system further differentiates the present invention from the prior art because prior art designs include no means for ensuring that all egg stacks face the same direction. Because the present invention ensures uniformity of the stacks of egg trays 52, the modules 50 of the present invention may be mechanically loaded and unloaded, resulting in significant labor cost savings.

It should be noted that the term "egg tray" as used in this Description shall include both paper and plastic trays of any configuration which are stackable one upon another, such as those manufactured by Cascade Diamond, packaging Corporation of America, Envirosys, or Frip Molded Container Corporation. This ability of the present invention to accommodate paper as well as plastic trays allows for significant weight and cost savings over prior art plastic egg skid designs.

Old plastic skid designs require the use of plastic trays for stability and do not incorporate internal structures to support the weight of overlying flats. This lack of internal support structures in prior art designs results in crushed eggs on the sides of the skid because the use of interlocking plastic trays alone is insufficient to stabilize the entire skid. Paper trays cannot be used with these old designs because the sheer weight of the overlying egg trays crushes the eggs on the bottom layers of the egg skid. The present invention overcomes all these disadvantanges.

Desirably, the at least one aperture 18 in the deck board 10 extends through the deck board 10 and is molded integral with or located in the vicinity of the upper and lower mating surfaces 15, 20. This preferred placement allows maximum airflow within the modular egg system 9, even when the system 9 is fully loaded with eggs 12. The most preferred embodiments of the instant invention possess four apertures 18 located in and extending through the points at which the upper mating surface 15 criss-crosses. These apertures 18 are preferably milled out or molded into the deck board 10 with a large enough diameter to maximize the flow of cool air over every egg 12 contained in the modular egg system 9 without sacrificing the ability of the deck board 10 to support the weight of any overlying modules 50.

Figure 4:
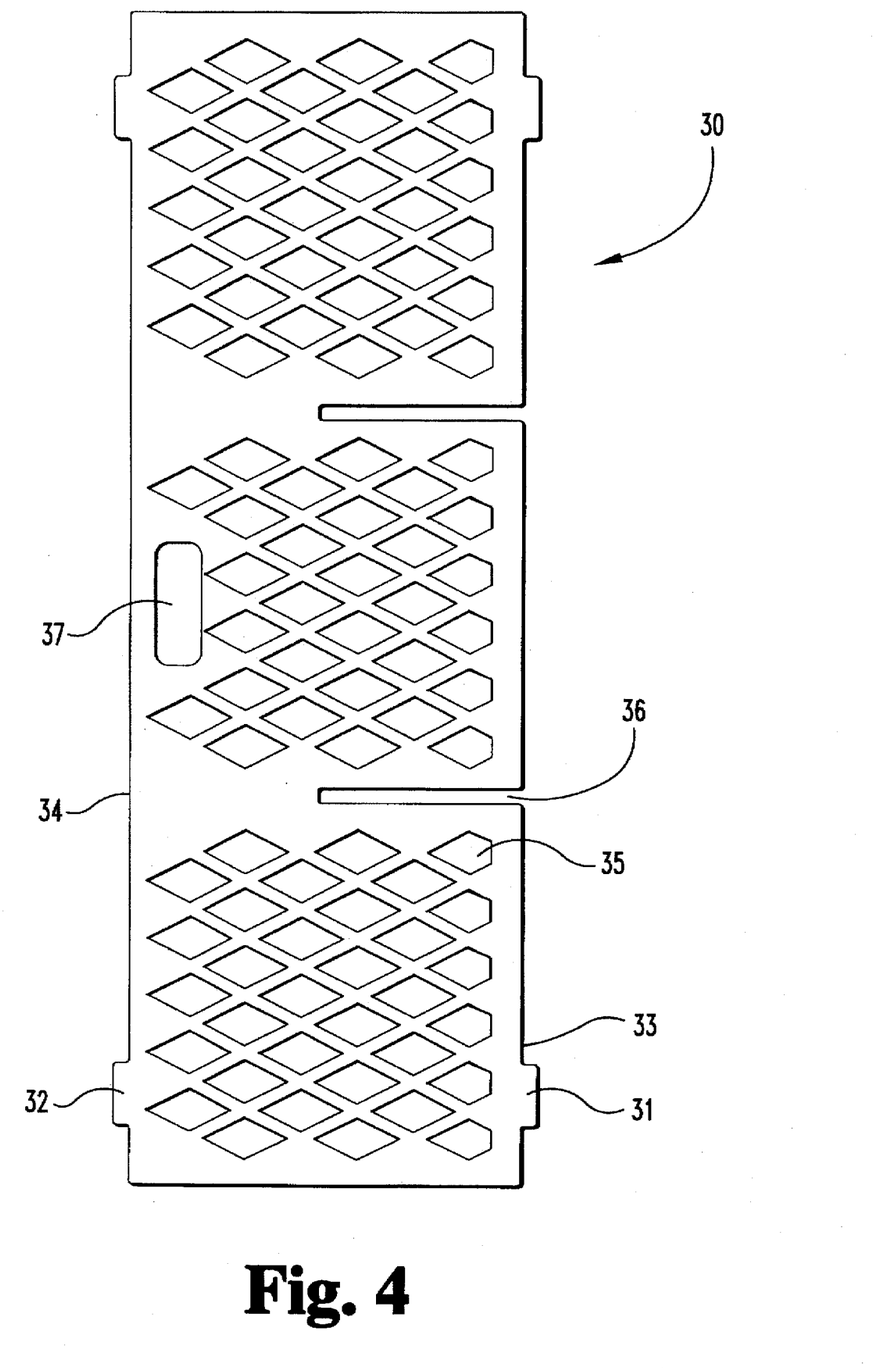
FIG. 4 is a side view of the first vertical member of the modular egg system of the present invention showing the airflow apertures and handhold.

The second component of the modular egg system 9, the first vertical member 30, comprises at least one bottom deck board connector 31, at least one top deck board connector 32, a bottom mating surface 33, a top mating surface 34, at least one aperture 35, and at least one mating slot 36. Preferred embodiments of the first vertical member 30 also include a handhold 37 to facilitate rapid manual assembly and disassembly of the modular egg system 9.

The at least one top deck board connector 32 is preferably manufactured integral with the top mating surface 34 and is also preferably of the tab type, although other connector types, especially those capable of being molded or milled into the first vertical member 30, are contemplated by and intended to come within the scope of the present invention. In any case, the most preferred first vertical member 30 includes two top deck board connectors 32 in or on the top mating surface 34. This top mating surface 34 is designed to mate with the lower mating surface 20 of the deck board 10, and the top deck board connectors are capable of being received completely within the corresponding vertical member connectors 21. In like fashion, the bottom deck board connector 31 is configured to engage securely its corresponding vertical member connector 16 when the bottom mating surface 33 mates with the upper mating surface 15 of the deck board 10.

The at least one, and more preferably two, mating slots 36 may be milled or molded into the first vertical member 30 vertically from the bottom mating surface 33 or from the top mating surface 34, but in the preferred embodiment cut vertically from the bottom mating surface 33 through the first vertical member 30 to a distance sufficient both to slidably mate the first vertical member 30 to the second vertical member 40 and to permit the bottom mating surface 33 to engage the upper mating surface 15. The at least one mating slot 36 may also be configured to slidably mate with and hold the second vertical member 40 at any angle relative to the first vertical member 30, but most preferably the at least one mating slot 36 will mate with and hold the second vertical member 40 perpendicular to the first vertical member 30, thereby forming a criss-crossed structure with a pattern identical to that of both the upper and lower mating surfaces 15, 20 of the deck board 10.

Of critical importance to the present invention is the at least one aperture 35 defined by and extending through the first vertical member 30. Preferred versions of the first vertical member 30 contain a plurality of apertures 35 spaced to match the locations of the eggs 12 in the stacks of egg trays 11. In the most preferred embodiments, the apertures 35 are diamond-shaped, but other shapes which permit maximum airflow over the exposed profile of the egg 12 in the egg tray 11 are contemplated by and intended to come within the scope of the instant invention.

Providing the first vertical member 30 with only one or a few apertures 35 is also contemplated by and intended to come within the scope of the present invention. However, it will be clear to those of ordinary skill in the art that the aperture configuration chosen should not compromise the structural integrity of the first vertical member 30, nor restrict airflow to any eggs 12.

While the first vertical member 30 may be of any linear dimensions capable of maintaining the lateral stability of the invention, its height is most preferably just higher than the height of six conventional egg trays 11 stacked one upon another. The preferred embodiment of the first vertical member 30 is also desirably at least as long as the deck board 10 to completely support the weight of any superposed egg-containing modules 50. In the same way, the preferred first vertical members 30 should be thick enough to hold the weight of as many egg-containing modules 50 as the skilled artisan chooses to stack on a deck board pallet 51.

Figure 5:
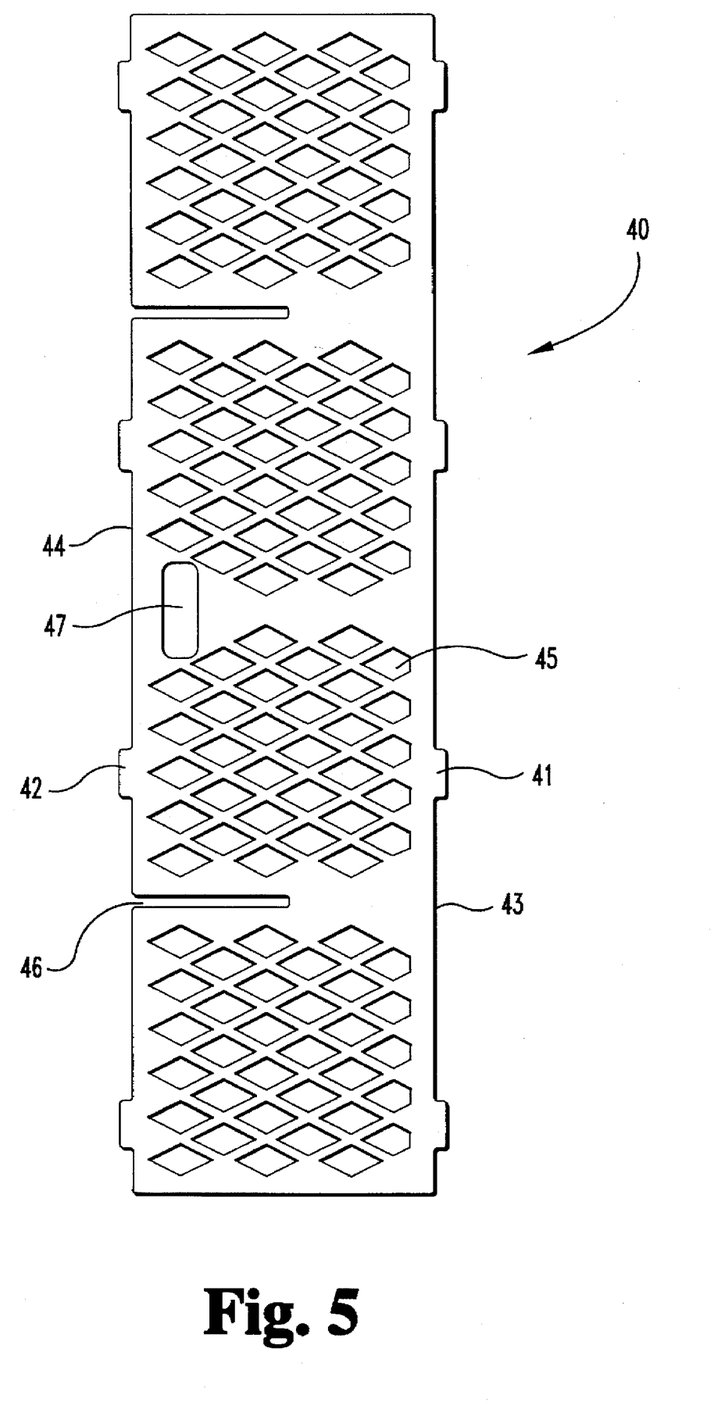
FIG. 5 is a side view of the second vertical member of the modular egg system of the present invention showing the airflow apertures and handhold.

The second vertical member 40 comprises the same general subparts and must comply with the same dimensional limitations as the first vertical member 30. Therefore, all descriptions of the first vertical member 30, its subparts, and all equivalents thereof are hereby referenced and intended to apply equally to the following description of the second vertical member 40; only the preferred embodiment of the second vertical member 40 is described.

The second vertical member 40 includes four bottom deck board connectors 41; four top deck board connectors 42; a bottom mating surface 43 designed to engage the upper mating surface 15 of the deck board 10; a top mating surface 44 adapted to engage the lower mating surface 20; and two mating slots 46, one adapted to slidably mate with one mating slot 36 of one first vertical member 30 and the other adapted to slidably mate with one mating slot 36 of another first vertical member 30.

As with the first vertical member 30, the preferred embodiment of the second vertical member 40 defines a plurality of apertures 45 clustered in discrete groups corresponding to the positions of the stacks of egg flats 52 located on the deck board 10. Each individual aperture 45 is preferably placed opposite an egg 12 contained in an egg tray 11. This placement prevents any obstruction of airflow over the eggs 12. A handhold 47 is also desirably provided to speed manual assembly and disassembly of the module 50.

Achieving the desired criss-cross configuration of the vertical members 30, 40 requires that at least one first vertical member 30 slidably mate with two second vertical members 40 placed parallel to each other and at right angles to the first vertical member 30. Preferred embodiments of the invention also separate the two second vertical members 40 to permit stacks of egg trays 52 to be placed between the two second vertical members 40 when those members 40 are connected to the deck board 10. When two first vertical members 30 are spaced apart from each other and slidably mated with two second vertical members 40 in a criss-cross pattern, a laterally stable support structure is created which may be placed between the stacks of egg trays 52 on the deck board 10 to support the weight of overlying egg tray stacks 52 and any additional modules 50. The use of this vertical support structure design is desirable because it avoids the instability and egg breakage associated with those prior art designs which place the weight of overlying flats directly upon the stacks of egg trays.

Although the components of a module 50 have been described, no complete description of their assembly has yet been provided. Accordingly, a module 50 is assembled as follows: two second vertical members 40 are attached to the deck board 10 by aligning their bottom mating surfaces 43 with the upper mating surface 15 and engaging their bottom deck board connectors 41 with the vertical member connectors 16. Two first vertical members 30 are then slidably mated in a criss-cross configuration with the two second vertical members 40 via their respective mating slots 36, 46, and their bottom mating surfaces 33 and bottom deck board connectors 31 lockingly engage the upper mating surface 15 and vertical member connectors 16 of the deck board 10. The module 50 is complete once the lower mating surface 20 of a deck board 10 is placed over and aligned with the criss-crossed vertical members 30, 40 and the vertical member connectors 21 positively engage the top deck board connectors 32, 42.

This configuration allows a module 50 to be constructed on the deck board pallet 51, then successive modules 50 stacked one on top of another, each module 50 positively engaging the module below it. Such positive engagement of the modules 50 ensures both that the modules 50 comprising the modular egg system 9 will not rotate or shift laterally in use, and that great heights of modules 50 may be attained without compromising the stability of the invention.

These modules 50 are successively assembled one on top of another as quickly as each deck board 10 can be filled with stacks of egg-containing trays 52. This procedure of filling a deck board 10 with stacks of egg trays 52, then assembling the next module 50 on top of that filled deck board 10 is continued until, in the preferred embodiment, a height of four modules and five egg tray layers is achieved. Although the preferred embodiment only stacks the modules 50 four high, it will be understood by those skilled in the art that embodiments having fewer or additional modules are also contemplated by the present invention.

Because all components of the modules 50 contain one or more apertures, the modular egg system 9 allows all eggs 12, including those located in the center of the modular egg system 9, to be cooled more rapidly than they would if contained within a prior art egg skid. Furthermore, the provision of a weight-bearing vertical support structure such as that created by the vertical members 30, 40 in the instant invention ensures both that the eggs 12 located near the deck board pallet 51 will not be crushed by the weight of the overlying egg tray-bearing modules 50 and that the modular egg system 9 will not shift laterally to any degree sufficient to break or dislodge the eggs 12 contained therein. This shift-resistance exhibited by the present invention obviates the need for the cardboard overlays, corner guards, and plastic wrapping required by all prior art egg skid designs.

As an additional advantage, the modular egg system 9 may be assembled using completely automated loose egg loading and unloading equipment. The keyway surface 14, the connectors 16, 21, 31, 32, 41, 42, and the fasteners 19 are configured to such dimensions and impart such stability to the system 9 that human hands need never touch the eggs 12 or the system 9 from the time the eggs 12 leave the hen until they are ultimately packed, processed, or hatched. For these reasons, among others, the present invention provides a significant improvement over the egg skid systems of the prior art.

Although the deck board connectors 31, 32, 41, 42 of the vertical members 30, 40 have been illustrated and described in the preferred embodiment as comprising tab type connectors, those of ordinary skill in the art will understand that reverse embodiments also come within the scope of the present invention. That is, embodiments in which the top and bottom deck board connectors 31, 32, 41, 42 comprise slots or other female-type connectors adapted to receivably engage the vertical member connectors 16, 21 of the deck board 10 are considered and intended to be encompassed herein.

One preferred embodiment of the present invention is manufactured from the plastic material known as high density polyethylene (HDPE). Alternatively, another preferred embodiment of the present invention is manufactured from a low density cellular plastic, or another USDA-approved, durable, lightweight, non-absorbent, and washable material.

It will be understood by those skilled in the art that all sizes, tolerances, and materials of all parts and portions of the present modular egg system 9 must comply with egg industry standards. Accordingly, the preferred embodiments of the modular egg system 9 should be large enough to accommodate at least twelve stacks 52 of six egg trays each per deck board, but not so large that moving the completed modular egg system with a conventional forklift is unwieldy or dangerous. The modules 50 of the present invention should also not be stacked so high on the deck board pallet 51 as to compromise the lateral stability of the system 9.

It is irrelevant what sort of plastic foot assembly is used, and it is irrelevant what type of egg trays the modules are destined to hold. What is relevant is that the various embodiments of the modular egg system of the present invention are used to safely store, transport, and quickly cool eggs and that all components making up the modular egg system of the present invention are strong, durable, lightweight, and washable.

When eggs are stored and/or transported using the present modular egg system, the eggs are less likely to be contaminated by microorganisms present on the surfaces of the system, will cool to any temperature at a rate more rapid than any rate achievable by prior art egg skid systems, and are far less likely to be broken than if they were loaded on a prior art type of egg skid. The configuration of the present invention will last longer than old art designs, and it can be recycled if it becomes overly worn. As well, the present modular egg system will significantly reduce the egg industry's costs for broken eggs, stretch wrap, corner guards, replacement materials, transportation, labor, and other associated expenses.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A modular loose egg system for improved safety in cooling, storing, and transporting eggs comprising:

at least one deck board having an upper surface and a lower surface; and at least one vertical support structure having a top surface and a bottom surface;

wherein said at least one deck board and said at least one vertical support structure are formed of a lightweight, durable, washable, nonabsorbent material; and wherein said at least one vertical support structure consists of at least one first mating member and at least one second mating member; wherein one of said at least one mating members is slidably mountable into the other; and further wherein said upper surface of said at least one deck board is adapted to attach said bottom surface of said at least one vertical support structure, and said lower surface of said at least one deck board is adapted to attach said top surface of said at least one vertical support structure; and further wherein said at least one deck board and said at least one vertical support structure are stackable one upon the other to create a stable, shift-resistant modular loose egg system; and apertures in said at least one deck board and said at least one vertical support structure, said apertures being shaped to facilitate airflow over all eggs contained in the modular loose egg system.

2. The modular loose egg system of claim 1, and further comprising:

a foot assembly; and wherein said at least one deck board further comprises at least one fastener adapted to positively engage said foot assembly to thereby create a pallet.

3. The modular loose egg system of claim 1, wherein said lightweight, durable, washable, nonabsorbent material comprises plastic.

4. The modular loose egg system of claim 1, wherein said upper surface of said at least one deck board further includes at least one connector adapted to engage said bottom surface of said at least one vertical support structure.

5. The modular loose egg system of claim 4, wherein said lower surface of said at least one deck board further includes at least one connector adapted to engage said top surface of said at least one vertical support structure.

6. The modular loose egg system of claim 1, and further comprising:

a key for positively engaging said upper surface of said at least one deck board; and a keyway for receiving said key.

7. The modular egg system of claim 6, wherein said keyway includes depressions shaped to accept a footprint of an egg tray.

8. The modular egg system of claim 7, wherein said apertures are provided in groups in the at least one vertical support structure; and further wherein said groups are positioned opposite stacks of said egg trays positively engaging said upper surface of said at least one deck board.

9. The modular egg system of claim 8, wherein said apertures are diamond shaped.

10. The modular egg system of claim 8, wherein said apertures are located in the at least one deck board adjacent said at least one vertical support structure when said upper surface of said at least one deck board is attached to said bottom surface of said at least one vertical support structure.

11. The modular egg system of claim 1, wherein said at least one vertical support structure includes a handhold.

12. The modular egg system of claim 1, wherein said at least one first mating member further includes a slot for engaging said at least one second mating member.

13. The modular egg system of claim 12, wherein said at least one second mating member further includes a slot for engaging said slot of said at least one first mating member.

14. The modular egg system of claim 1, wherein said at least one deck board further includes a plurality of ribs to impart extra strength and warp-resistance to said at least one deck board.

15. The modular egg system of claim 1, wherein said at least one vertical support structure comprises a criss-cross configuration.

16. A method for obtaining rapid cooling of loose eggs contained within an egg skid system, comprising the steps of:

loading a plurality of loose eggs into a plurality of egg trays, wherein said plurality of egg trays are stackable;

stacking said plurality of egg trays one upon another to form a stack;

loading said stack onto a deck board having at least one aperture therethrough to facilitate air flow over said plurality of loose eggs;

providing at least two vertical members, which vertical members are slidably mountable one into another, and which vertical members further comprise connectors adapted to positively engage said deck board;

slidably mounting one of said vertical members into the other to thereby form a support structure;

connecting said support structure to an upper surface of said deck board;

placing a second deck board over said support structure;

connecting a lower surface of said second deck board to a top surface of said support structure;

loading an upper surface of said second deck board with a second stack of said egg trays; and placing said completed egg-containing skid structure into a cooler.

* * * * *